(12) United States Patent
Norp et al.

(10) Patent No.: US 9,747,784 B2
(45) Date of Patent: Aug. 29, 2017

(54) EMERGENCY SYSTEM AND METHOD

(75) Inventors: Antonius Hendrikus Johannes Norp, The Hague (NL); Franklin Selgert, Berkel en Rodenrijs (NL)

(73) Assignees: KONINKLIJKE KPN N.V., The Hague (NL); NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 593 days.

(21) Appl. No.: 12/315,848

(22) Filed: Dec. 5, 2008

(65) Prior Publication Data

US 2009/0163170 A1  Jun. 25, 2009

(30) Foreign Application Priority Data

Dec. 21, 2007 (EP) ..................................... 07024896

(51) Int. Cl.
*G08B 27/00* (2006.01)
*H04W 4/22* (2009.01)
*H04W 76/00* (2009.01)

(52) U.S. Cl.
CPC .............. *G08B 27/006* (2013.01); *H04W 4/22* (2013.01); *H04W 76/007* (2013.01)

(58) Field of Classification Search
CPC ..... G08B 27/006; H04W 4/22; H04W 76/007
USPC ......................... 455/404.1, 404.2, 456.1–457
See application file for complete search history.

(56) References Cited

U.S. PATENT DOCUMENTS

| 5,838,237 | A | * | 11/1998 | Revell | ....................... | G01S 1/68 |
| | | | | | | 340/456 |
| 5,896,382 | A | * | 4/1999 | Davis | .................. | H04L 12/2801 |
| | | | | | | 370/347 |
| 6,370,381 | B1 | * | 4/2002 | Minnick | ............... | H04W 36/22 |
| | | | | | | 455/445 |
| 6,462,665 | B1 | * | 10/2002 | Tarlton et al. | ................ | 340/601 |
| 6,493,629 | B1 | * | 12/2002 | Van Bosch | ............ | G08G 1/205 |
| | | | | | | 701/515 |
| 7,701,969 | B2 | * | 4/2010 | Carrigan | ................. | H04L 29/06 |
| | | | | | | 370/466 |
| 2002/0026491 | A1 | * | 2/2002 | Mason et al. | ................. | 709/207 |
| 2002/0091527 | A1 | * | 7/2002 | Shiau | ...................... | G10L 15/30 |
| | | | | | | 704/270.1 |
| 2004/0044600 | A1 | * | 3/2004 | Chu | ....................... | G06Q 30/06 |
| | | | | | | 705/34 |

(Continued)

FOREIGN PATENT DOCUMENTS

EP  1 209 886  5/2002
JP  2002 185389  6/2002

(Continued)

*Primary Examiner* — Mehmood B Khan
(74) *Attorney, Agent, or Firm* — Hamilton, Brook, Smith & Reynolds, P.C.

(57) ABSTRACT

A system and a method for receiving local emergency information on a mobile device in a system having a telecommunication network and at least one local communication network having one or more wireless access points. The mobile device receives a general emergency signal over a broadcast channel of the telecommunication network. In response to the general emergency signal, the mobile device connects to one of the wireless access points and transmits a request for transmitting the local emergency information to the mobile device. The mobile device then receives the local emergency information from one of the wireless access points.

11 Claims, 4 Drawing Sheets

(56) References Cited

U.S. PATENT DOCUMENTS

| | | | |
|---|---|---|---|
| 2005/0075116 A1* | 4/2005 | Laird | A61B 5/04 455/456.3 |
| 2005/0085257 A1* | 4/2005 | Laird | A61B 5/04 455/550.1 |
| 2005/0181776 A1* | 8/2005 | Verma | H04L 69/329 455/418 |
| 2006/0129816 A1* | 6/2006 | Hinton | H04L 63/0815 713/169 |
| 2006/0271216 A1* | 11/2006 | Shim | G05B 23/0267 700/95 |
| 2007/0149167 A1* | 6/2007 | Lee | H04M 3/42348 455/404.2 |
| 2007/0207771 A1 | 9/2007 | Bowser et al. | |
| 2007/0232328 A1* | 10/2007 | Kramarz-Von Kohout | H04W 4/22 455/456.2 |
| 2007/0254623 A1* | 11/2007 | Branda | H04W 4/22 455/404.1 |
| 2008/0032666 A1* | 2/2008 | Hughes et al. | 455/404.1 |
| 2008/0162667 A1* | 7/2008 | Verma | G06Q 10/10 709/218 |
| 2008/0189721 A1* | 8/2008 | Buchanan | G06F 9/4812 719/318 |
| 2009/0013087 A1* | 1/2009 | Lorch | H04M 1/72552 709/232 |
| 2009/0034419 A1* | 2/2009 | Flammer, III | H04L 45/124 370/238 |
| 2009/0215478 A1* | 8/2009 | Leinonen et al. | 455/466 |
| 2010/0110956 A1* | 5/2010 | Hepworth | H04W 4/22 370/312 |
| 2011/0212700 A1* | 9/2011 | Petite | H04W 4/12 455/404.1 |
| 2013/0065550 A1* | 3/2013 | Green | H04W 4/22 455/404.2 |

FOREIGN PATENT DOCUMENTS

| | | | |
|---|---|---|---|
| JP | 2004 241913 | 8/2004 | |
| JP | 2004-328294 | 11/2004 | |
| JP | 2005-242438 | 9/2005 | |
| JP | 2007 066034 | 3/2007 | |
| JP | 2007-135000 | 5/2007 | |
| WO | WO 2004062114 A2 * | 7/2004 | H04W 48/16 |
| WO | WO 2006/066629 | 6/2006 | |

* cited by examiner

|        | Emer_id 1 | Emer_id 2 | Emer_id 3 | ..... |
|--------|-----------|-----------|-----------|-------|
| WAP 1  |           |           |           |       |
| WAP 2  | ▢         |           |           |       |
| WAP 3  | ▢         | ▢~30      |           |       |
| WAP 4  |           |           |           |       |
| WAP 5  |           |           |           |       |
| . . . .|           |           |           |       |

FIG. 5

EMERGENCY SYSTEM AND METHOD

BACKGROUND OF THE DISCLOSURE

1. Field of the Invention

The invention relates to the field of wireless communication. More specifically, the invention relates to a method for receiving emergency information, in particular local emergency information. The invention also relates to system and method for providing such emergency information.

The new millennium has shown various instances of disasters, ranging from world events such as the attacks in the United States on Sep. 11, 2001 to the tsunami on Boxing Day 2004 in the Asia-Pacific region to many local events. Emergency warning systems are crucial in such situations as well as in other emergency cases, including large fires and earthquakes.

Previously, people were alerted to the existence of an emergency situation by audible and visual alarm systems. These systems, however, did not inform people how to act in such situations. Although evacuation plans are normally in place, many people fail to know these plans in sufficient detail to apply them in critical situations. Dynamic changes in such situations may also require changes in evacuation plans that in turn need to be communicated to the public.

Today, virtually everyone possesses or can be in contact with someone who possesses a mobile telecommunication device. Ready availability of mobile communications devices can be a public service asset to provide critical information to the public during emergency situations.

As an example, ETSI is currently attempting to standardize emergency communications in TS 102 182. One of the ideas is to use a cell broadcast service (CBS) allowing broadcasting of messages to mobile phones of a large number of citizens in a specific location within a short predictable period of time. It is the aim to provide an alert to 50% of the citizens in the relevant area within 3 minutes and to 97% of the citizens in that area within 5 minutes. Due to the nature of the broadcast a single message can reach all mobile phones, including those of roamers. Messages can be repeated for those who enter the area later or have missed previous messages. Cell broadcast uses a dedicated channel, so the functionality will generally be available, even if voice and data traffic in the network are congested. The CBS system allows providing information transmission concerning the emergency situation to people in the relevant area.

The area for the CBS system can be as small as one cell. However, such a cell may be larger than the area relevant for the disaster. Moreover, one or more cell areas will rarely exactly match the relevant areas for providing the emergency information. Finally, within a cell, the relevant emergency information may be different for different positions within that cell. As an example, people being on several floors of a building may require different emergency information relating, e.g., to the use of elevators.

2. Description of the Prior Art

US Patent Publication No. 2007/0207771 describes a system and method that enables distribution of public warning information using network infrastructure. Public warning messages are received by a wireless receiver coupled to a network. The wireless receiver broadcasts a message to users on the network responsive to receiving a public warning message.

Broadcasting on a local network is not straightforward. Broadcasting of significant amounts of data is generally not possible for such networks. Typically, only data such as a cell ID, an SSID etc. are broadcast. Furthermore, the cells of a local network are typically of limited size and broadcasting is considered to be a waste of resources if the probability of presence of people in such a cell is low. Moreover, broadcasting requires judgment when to start and stop the broadcast transmission.

There exists a need in the art for an improved emergency notification method and system that enables rapid communication of locally relevant information despite network traffic congestion.

SUMMARY OF THE INVENTION

It is an object of the present invention to provide an improved method and system for receiving and providing emergency information, in particular emergency information that is relevant for a particular location.

One embodiment of the present invention includes a method of receiving local emergency information on a mobile device in a system comprising a telecommunication network and at least one local communication network comprising one or more wireless access points. The mobile device receives a general emergency signal, e.g., over a broadcast channel of the telecommunication network. Alternatively another channel, such as a dedicated channel, may be used to provide the general emergency signal. A cell broadcast, however, may be advantageous. In response to the general emergency signal, the mobile device connects to one of the wireless access points and transmits a request for transmitting the local emergency information to the mobile device. The mobile device then receives the local emergency information from one of the wireless access points.

Another embodiment of the present invention includes a system configured for providing local emergency information to a mobile device. The system comprises at least one local communication network comprising one or more wireless access points and a server having access to the local emergency information. The wireless access points are configured for receiving a request for transmitting the local emergency information and for transmitting the request to the server. The server is configured to retrieve the local emergency information in response to the request and to transmit the local emergency information to at least one of the wireless access points. The wireless access points are configured for transmitting the local emergency information to the mobile device.

In another embodiment, a method for providing local emergency information is proposed. The method is performed in a system comprising at least one local communication network comprising one or more wireless access points and a server having access to the local emergency information. A request for transmitting the local emergency information is received from the mobile device at one of said wireless access points. The local emergency information is retrieved from the server in response to this request. The local emergency information is then transmitted to the mobile device.

Other embodiments of the present invention include computer programs stored on computer-readable media, electronic carriers or media and mobile devices for use in practicing these methods and systems.

The proposed method and system combines the use of a telecommunications network and a local area network, which is especially advantageous for large scale events. The general emergency signal over the telecommunications network, which may be a cellular telephone broadcast signal, triggers the mobile devices of users to retrieve public emergency information of local relevance, i.e., information applicable only to an area covering only a portion of a cell. The local emergency information is locally stored and provided and can be conformed to the local situation by local system administrators. There is no need to broadcast from a local network.

The local emergency information may comprise text, illustrations, audio information, video information etc. The local emergency information may, e.g., comprise information regarding the most appropriate escape route, hiding places, map of assembly areas and ways how to act regarding, e.g., whether to open windows and doors The mobile device may transmit multiple requests for local emergency information, e.g., if the user of the mobile device moves through the area/building. The appropriate local emergency information may then change with the actual location of the user Another embodiment provides an additional feature that the user of the mobile device is automatically given the local emergency information without requiring the intervention of the user. The user simply consults the display of his mobile device (or an audible equivalent thereof) to obtain the locally relevant emergency information.

Another embodiment of the present invention provides the advantage of not overloading the wireless access points in cases of emergency with requests for local emergency information. The user may, e.g., be offered a soft key that allows him to transmit the request by simply operating this key. This embodiment will result in timing differences between various requests. Moreover, some people may not need the local emergency information because they know how to act or they follow the instructions of others.

An additional embodiment provides the advantage of signaling to mobile devices that local emergency information is present. This may aspect may, e.g., be implemented by setting a flag in a broadcast channel, e.g., the SSID channel, of the local network. The mobile device may then only transmit a request for the local emergency information if this information is present at the server. The embodiment may save radio resources and may also improve the reliability of the emergency service.

The local communication network may not be open for everybody within the coverage area of this network. As an example, a communication network of a company may not be open to visitors by default. Authentication is usually required in these cases. The local communication network should be configured for recognizing the request for local emergency information from the mobile device. Some embodiments of the present invention ensure that the local emergency information is always accessible to substantially all mobile devices in the coverage area of the local communication network. To that end, mobile devices may have a programmed account and/or available channel for making such requests (and receiving the information) and the local communication network is programmed to accept such requests under all circumstances.

Another embodiment of the present invention provides the advantage that mobile devices interrogate the wireless access points for local emergency information. Polling generally introduces timing differences between the various requests and, therefore, prevents overloading of the wireless access points.

Some embodiments of the present invention provide the advantage of facilitating the retrieval of required local emergency information from the server system by receiving already a high level indication about the type of the emergency (e.g., earthquake, fire, terrorist attack, flooding etc.) in order to improve the accuracy of the local emergency information.

Some of the embodiments described herein increase the accuracy of the local emergency information by allowing the local emergency information to be dependent on the wireless access point to which the mobile device connects.

Hereinafter, embodiments of the invention will be described in further detail. It should be appreciated, however, that these embodiments may not be construed as limiting the scope of protection of the present invention.

BRIEF DESCRIPTION OF THE DRAWINGS

The teachings of the present invention can be readily understood by considering the following detailed description in conjunction with the accompanying drawings, in which:

FIG. 5 shows an example of a database model for the server apparatus of FIG. 3.

DETAILED DESCRIPTION

After considering the following description, those skilled in the art will clearly realize that the teachings of my invention can be readily utilized in mobile device emergency communications systems.

Figure 1:
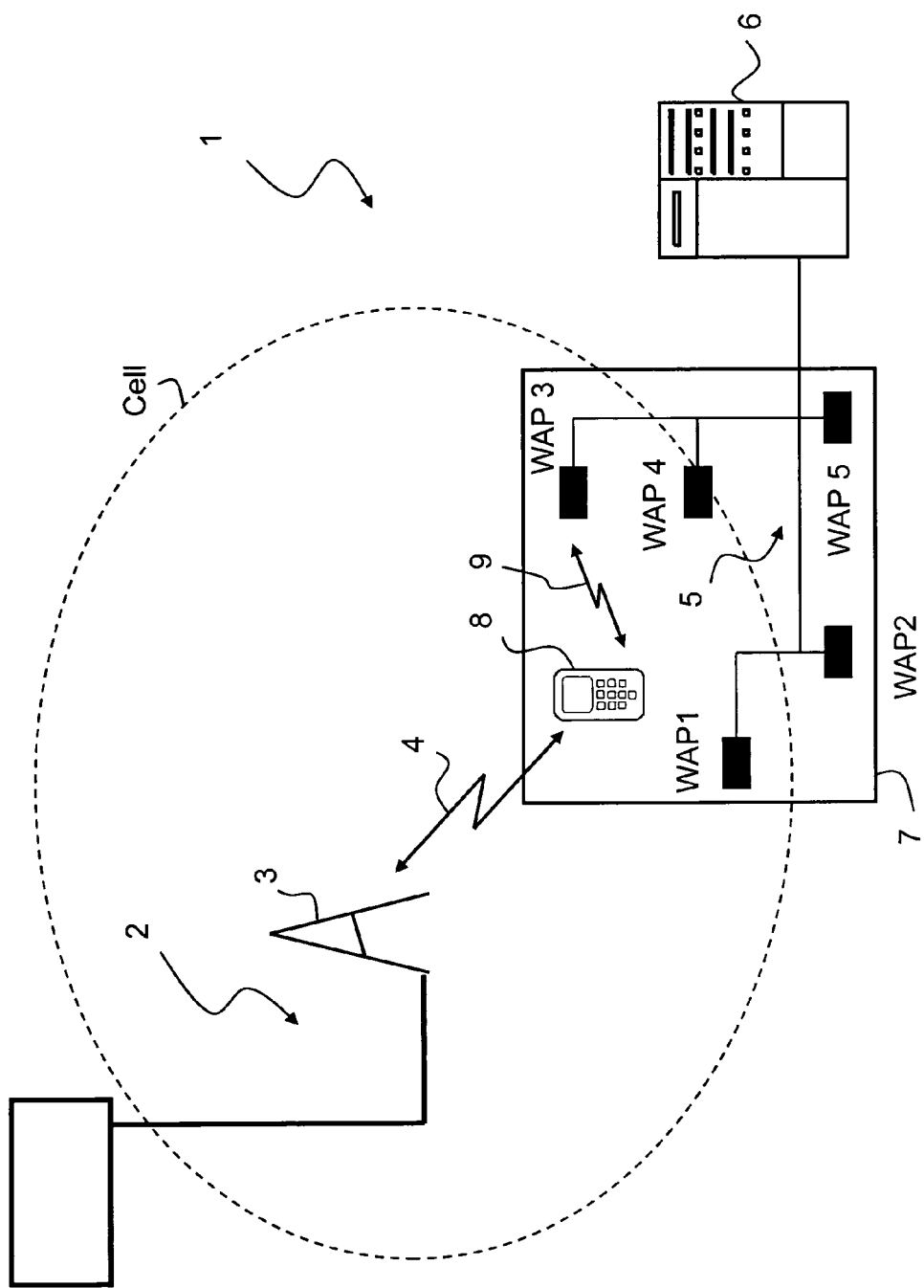
FIG. 1 is a schematic illustration of a system for providing local emergency information.

FIG. 1 shows a system 1 containing a telecommunications infrastructure 2. A base station 3 of the telecommunications infrastructure 2 defines a radio cell wherein cell broadcast signals 4 are transmitted. The telecommunications infrastructure 2 generally comprises a plurality of base stations 3 connected to a wired system in a manner generally known to the person skilled in the art. The telecommunications network 2 may, e.g., be a GSM network, a UMTS network or another wireless communication network employing any other communications protocol or standard.

The system 1 also comprises a local communication network 5 comprising a plurality of wireless access points (WAP 1-WAP 5 labeled herein for illustrative purposes) communicatively connected to a server 6. As shown in the example of FIG. 1, the local communication network 5 may exist in a single company building 7. The company building generally comprises more than five wireless access points distributed over the company area, possibly on various floors of the building. Of course, the building may also be a public building or series of buildings, such as a hotel, an airport, a government building etc. Generally, the company area or impacted site only covers a portion of the cell area, as depicted in FIG. 1.

A mobile device 8, such as a mobile phone, a laptop computer, a personal digital assistant (PDA) or any other communication device intended for being portable, is configured for communication with both the telecommunications network 2 and the local communication network 5. Communication 9 between the local communication network 5 and the mobile device 8 may be a WLAN communication network. Alternatives include Bluetooth, WiMax, HSPA, RFC, etc. The mobile device 8 comprises one or more keys and a display.

Figure 3:
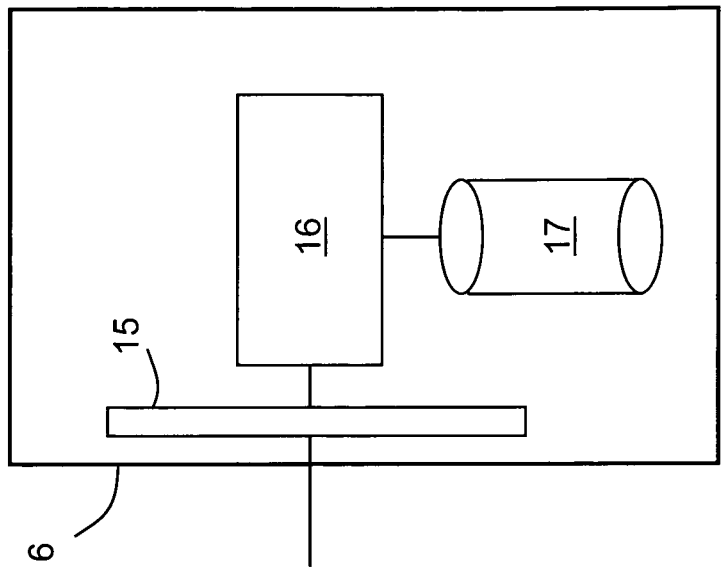
FIG. 3 is a schematic illustration of a server apparatus configured for operating in the system of FIG. 1.
Figure 2:
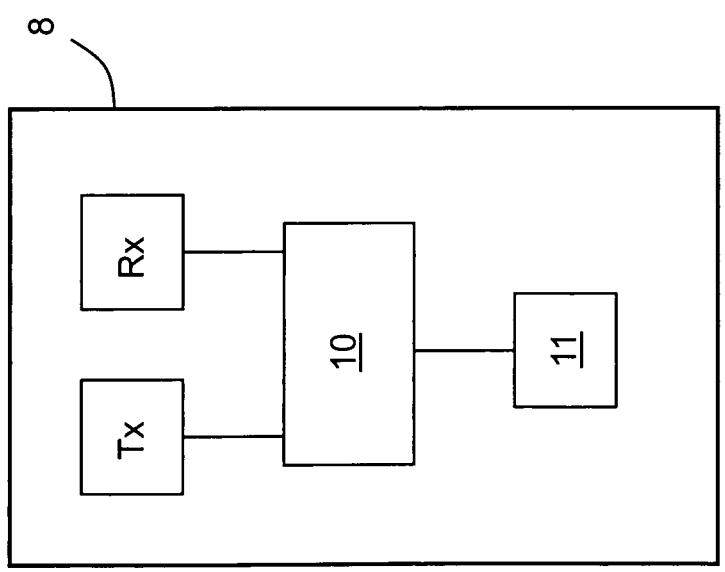
FIG. 2 is a schematic illustration of a mobile device configured for operating in the system of FIG. 1.

FIGS. 2 and 3 depict schematic illustrations of the mobile device 8 and the server 6, respectively.

The mobile device 8 comprises a transmitting portion Tx and a receiving portion Rx. Both portions communicate with a processor 10 connected to a storage device 11.

The server 6 comprises a network interface 15 through which the server 6 is communicatively connected to the wireless access points WAP 1-WAP 5. The communication signals are processed by processor 16. The processor 16 has access to an internal or external database 17 with local emergency information. The local emergency information consists of emergency information relevant only to the building 7.

Figure 4:
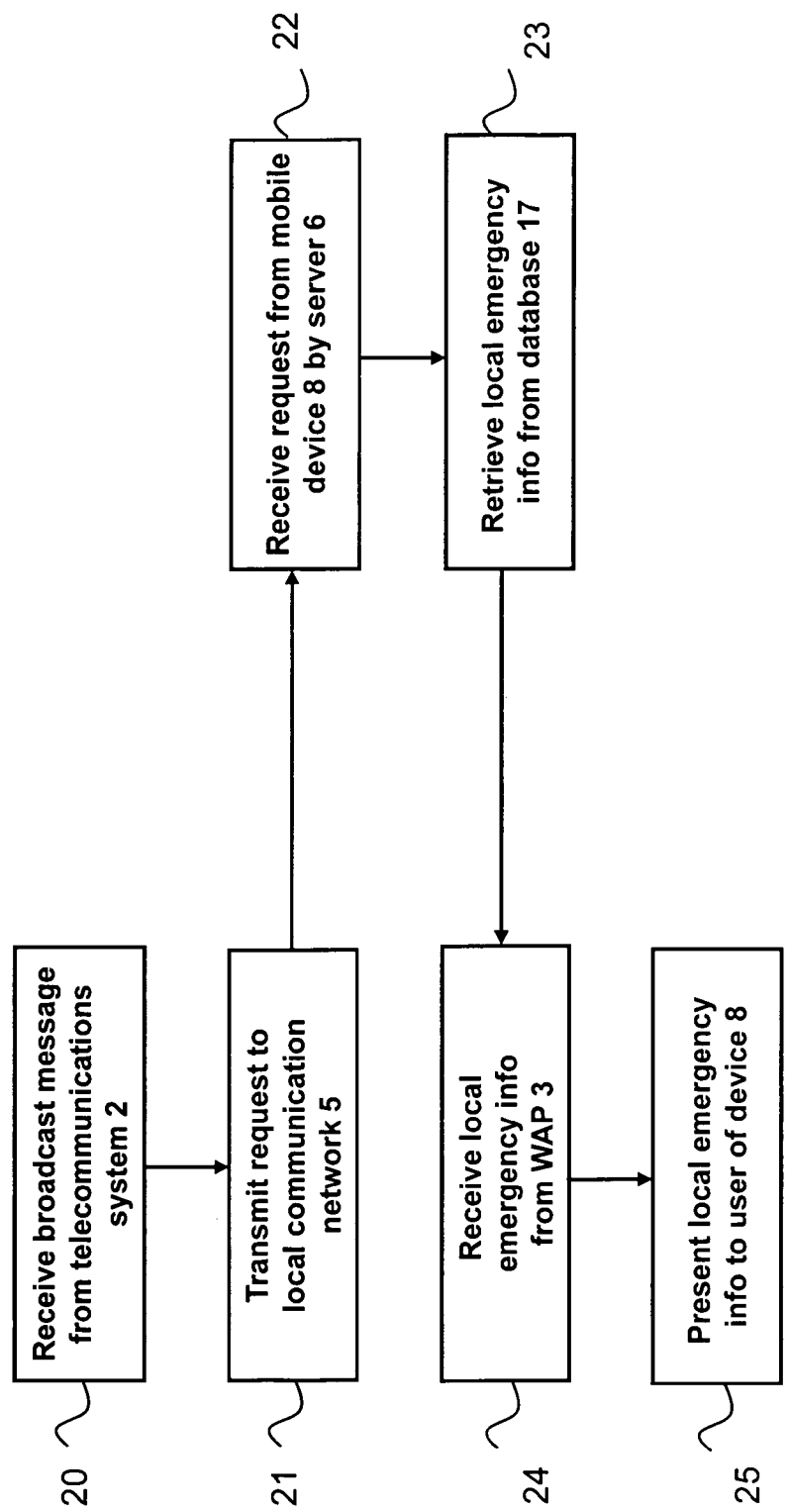
FIG. 4 shows a flow chart comprising steps of a method of operating the system of FIG. 1.

An embodiment for operating the system will now be described with reference to FIGS. 4 and 5.

It is assumed that an emergency situation is detected. Exemplary situations can include Outage Emergency, Avalanche Warning, Avalanche Watch, Biological Hazard Warning, Blizzard Warning, Boil Water Warning, Chemical Hazard Warning, Child Abduction Emergency, Civil Danger Warning, Civil Emergency Message, Coastal Flood Warning, Coastal Flood Watch, Contagious Disease Warning, Dam Break Warning, Dam Watch, Dust Storm Warning, Earthquake Warning, Emergency Action Notification, Emergency Action Termination, Evacuation Watch, Fire Warning, Flash Flood Watch, Flash Flood Statement, Flash Flood Warning, Flash Freeze Warning, Flood Statement, Flood Warning, Food Contamination Warning, Freeze Warning, Hazardous Materials Warning, Hurricane Statement, Hurricane Warning, Hurricane Watch, High Wind Warning, High Wind Watch, Iceberg Warning, Immediate Evacuation, Industrial Fire Warning, Land Slide Warning, Law Enforcement Warning, Local Area Emergency, Nuclear Power Plant Warning, Power Outage Advisory, Radiological Hazard Warning, Shelter In-Place Warning, Special Marine Warning, Special Weather Statement, Severe Thunderstorm Warning, Severe Thunderstorm Watch, Severe Weather Statement, Terrorist Attack, Tornado Warning, Tornado Watch, Tropical Storm Warning, Tropical Storm Watch, Tsunami Warning, Tsunami Watch, Volcano Warning, Wild Fire Warning, Winter Storm Warning, and Winter Storm Watch.

A cell broadcast message 4 is transmitted from the telecommunications system 2. The cell broadcast message 4 may include an emergency indicator signaling that the message relates to a Fire Warning. The cell broadcast message 4 is received by the receiver portion Rx of the mobile device 8 (step 20 in FIG. 4) and may then be processed by processor 10. The processing of this general emergency message gets priority over other tasks of the processor 10.

It should be appreciated, however, that the general emergency signal may be transmitted over another channel or network. The signal may, e.g., be an SMS message.

Subsequently, in step 21 of FIG. 4, a request is transmitted for the local emergency information from the mobile device 8, particularly from the transmitter portion Tx, to the local communication network 5 using the WLAN network communication protocol. The request may contain the emergency indicator obtained from the telecommunications network 2.

The request may be triggered in various ways. As a first example, the general broadcast emergency message 4 may trigger the mobile device 8 to transmit automatically the request for the local emergency information. To that end, when the processor 10 processes the incoming general emergency information, the processor retrieves predetermined channel information or a predetermined account information from the storage 11 and connects to the local communication network 5 automatically, using the pre-stored channel information and/or pre-stored account information. The wireless access points and the server are configured to accept the request using this information.

An alternative of triggering the request includes the processor 10 to provide an indication that a general emergency message has been received on the display of the mobile device 8. The user is presented with an option to transmit the request for the local emergency network 5 for the local emergency information, e.g., by presenting this option as a soft or hard key function of the mobile device 8. If the user selects the option, the request is transmitted to the local communication network 5 in the same manner as described in the previous paragraph.

If the local communication network 5 is a closed network, the above method provides that the requests for local emergency information can be received and processed by the server 6. A default account may be programmed in the mobile device 8 that ensures access to the server 6. Also, a particular channel, e.g., an SSID channel, may be provided to guarantee communication with the server 6 in an otherwise closed local communication network 5 requiring authentication. The request contains a flag that authentication is not required. The server 6 may be programmed such that access is provided to the local emergency information only.

In order to transmit the request of step 21, the mobile device connects to one of the wireless access points, e.g., WAP 3. The most appropriate wireless access point can be selected by a polling mechanism. Generally, the wireless access point provides the best signal, and generally, that would be the access point closest to the mobile device.

An appropriate wireless access point WAP1-WAP 5 may be selected on the basis of an emergency information presence indication from one or more of the wireless access points. This prevents that requests for local emergency information are made to wireless access points that, e.g., do not support the service.

The request is subsequently received by this wireless access point 3 (WAP 3), together with the emergency indicator indicating the type of emergency. The request is forwarded to and received by the server 6 (step 22) and possibly also includes an identifier of the wireless access point connected to the mobile device 8.

The request of step 21 is then received by the server 6 through the network interface 15. It is now assumed that the request contains both the emergency indicator and the identifier of the wireless access point to which the mobile device 8 is connected (here: WAP 3).

The processor 16 of the server 6 now searches for the relevant local emergency information in the database 17 (step 23).

Figure 5:
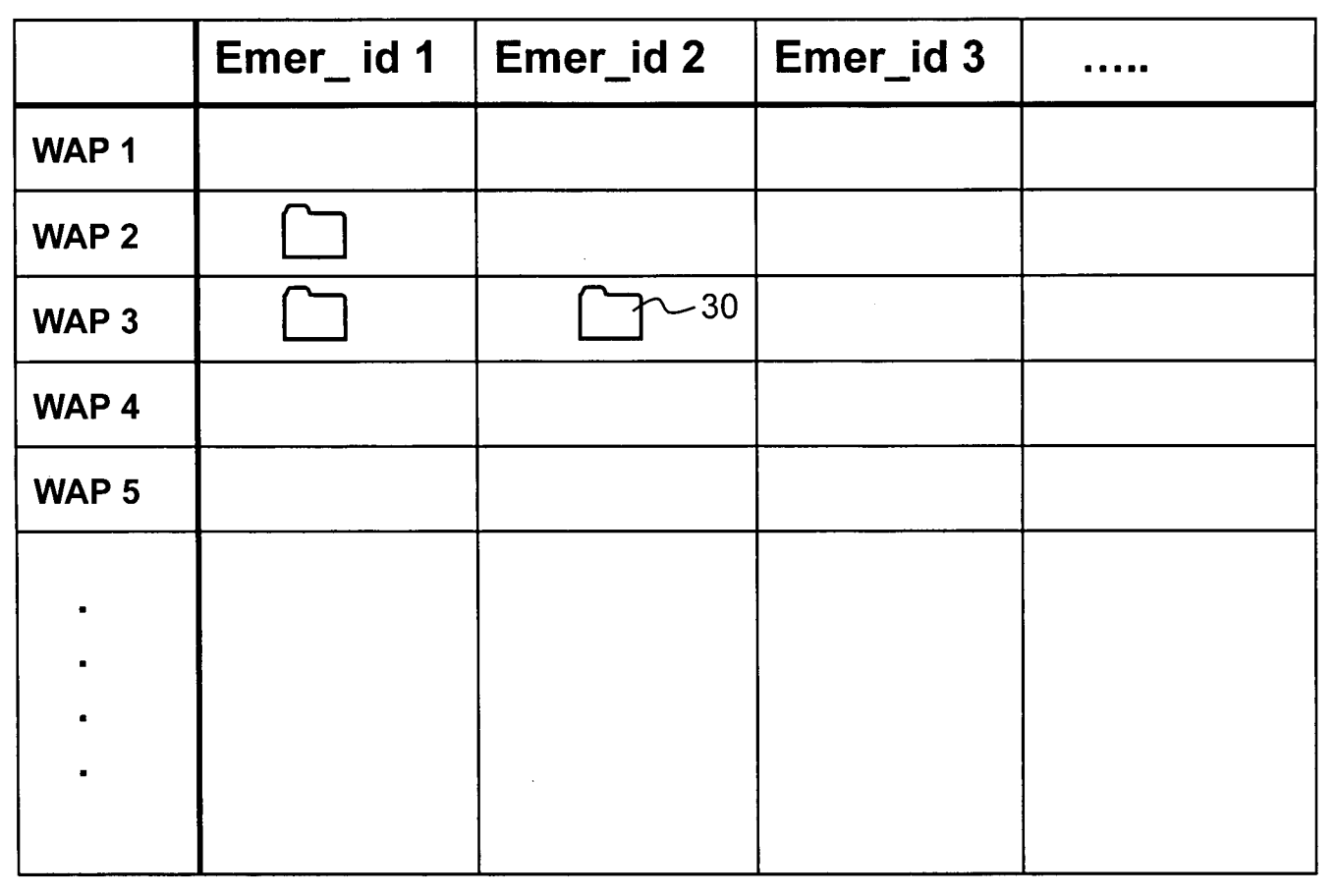

FIG. 5 provides an embodiment of the database model from which the local emergency information can be selected. The emergency indicator (Emer_id 1, Emer_id 2, Emer_id 3, etc.) and the wireless access point identifier (WAP 1, WAP 2, WAP 3, WAP 4, WAP 5, . . . ) serve to select the local emergency information from the database 17. If it is assumed the Fire Alarm has emergency indicator Emer_id 2, local emergency information 30 would be selected.

Of course, more advanced database models can be envisaged. As an example, the information stored in the database 17 can be divided into the smallest possible units. The local emergency information can then subsequently be assembled upon receiving a request for this information.

It should be appreciated that it is not necessary to obtain information about the emergency indicator or the wireless access point identifier, although this information may improve the accuracy and relevancy of the resulting local emergency information. As an example, if the wireless access point identifier fails, all wireless access points WAP 1-WAP 5 would still be able to provide local emergency information for the building site 7 for the emergency indicated by the emergency indicator.

The local emergency information 30 obtained from the database 17 is then communicated again to the mobile device 8 via the wireless access point WAP 3. If the user of the mobile device 8 has moved in the mean time and is now connected to another wireless access point, the local emergency information may be communicated to the mobile device 8 over that other wireless access point. In step 24 of FIG. 4, the local emergency information 30 is received by the mobile device. The local emergency information 30 is then presented to the user of the mobile device 8, e.g., using the display, the speaker or any other human-machine interface of the mobile device (step 25).

It should be appreciated that if a mobile device 8 had already logged in to the local communication network, the server 6 will also provide local emergency information to this mobile device 8.

Although various embodiments which incorporate the teachings of the present invention have been shown and described in detail herein, those skilled in the art can readily devise many other varied embodiments that still incorporate these teachings.

What is claimed is:

1. A method comprising:
   a mobile device receiving, via a first network, an emergency indicator, the emergency indicator indicative of a specific emergency;
   responsive to the mobile device receiving, via the first network, the emergency indicator, the mobile device submitting, via a second network that is different from the first network, a request for emergency information pertaining to the specific emergency, the request comprising the received emergency indicator wherein the emergency information pertaining to the specific emergency is selectable on the basis of the emergency indicator; and
   the mobile device receiving, via the second network, the requested emergency information pertaining to the specific emergency.

2. The method according to claim 1, wherein the step of the mobile device submitting, via the second network that is different from the first network, the request for emergency information comprising the received emergency indicator is performed automatically in response to the mobile device receiving, via the first network, the emergency indicator.

3. The method according to claim 1, further comprising:
   the mobile device providing to a user of the mobile device an indication that the mobile device received the emergency indictor;
   the mobile device receiving a request from the user to submit the request for emergency information;
   responsive to the mobile device (i) receiving, via the first network, the emergency indicator and (ii) receiving the request from the user to submit the request for the emergency information, the mobile device submitting, via the second network that is different from the first network, the request for emergency information comprising the received emergency indicator.

4. The method according to claim 1, wherein the second network comprises a wireless access point that provides a freely accessible channel, the method further comprising:
   the mobile device connecting to the wireless access point using the freely accessible channel, wherein the mobile device submits the request for emergency information comprising the received emergency indicator via the freely accessible channel.

5. The method according to claim 1, wherein the second network comprises a wireless access point, and wherein the mobile device connects to the wireless access point using a predetermined account.

6. The method according to claim 1, further comprising:
   responsive to the mobile device receiving, via the first network, the emergency indicator, the mobile device repeatedly submitting in polling fashion, via the second network that is different from the first network, the request for emergency information comprising the received emergency indicator.

7. The method according to claim 1, wherein the emergency information comprising the received emergency indicator relates to a site having exactly one building.

8. The method according to claim 1, wherein the emergency information comprising the received emergency indicator relates to a site having a plurality of buildings.

9. A non-transitory computer-readable medium having executable instructions for causing a processor within a computer-based mobile device to perform a method comprising:
   the mobile device receiving, via a first network, an emergency indicator, the emergency indicator indicative of a specific emergency;
   responsive to the mobile device receiving, via the first network, the emergency indicator, the mobile device submitting, via a second network that is different from the first network, a request for emergency information pertaining to the specific emergency, the request comprising the received emergency indicator wherein the emergency information pertaining to the specific emergency is selectable on the basis of the emergency indicator; and
   the mobile device receiving, via the second network, the requested emergency information pertaining to the specific emergency.

10. A mobile device comprising an antenna, a processor, a storage device accessible by the processor, the storage device storing a computer program having a software code portions that when run by the processor enables the mobile device to:
    receive, via a first network, an emergency indicator, the emergency indicator indicative of a specific emergency;
    responsive to receiving, via the first network, the emergency indicator, submit, via a second network that is different from the first network, a request for emergency information pertaining to the specific emergency, the request comprising the received emergency indicator wherein the emergency information pertaining to the specific emergency is selectable on the basis of the emergency indicator; and
    receive, via the second network, the requested emergency information pertaining to the specific emergency.

11. The mobile device of claim 10 further configured for receiving from a wireless access point an emergency information presence indication and for selecting a wireless access point for submitting the request, on the basis of the received emergency information presence indication.

\* \* \* \* \*